(12) United States Patent
Lee (10) Patent No.: US 10,916,978 B2
(45) Date of Patent: Feb. 9, 2021

(54) ROTOR HAVING A FIRST CORE AND A SECOND CORE WITH PROTRUSIONS AND GROOVES COUPLING THE CORES TO EACH OTHER

(71) Applicant: LG INNOTEK CO., LTD., Seoul (KR)

(72) Inventor: Byung Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 93 days.

(21) Appl. No.: 16/110,709

(22) Filed: Aug. 23, 2018

(65) Prior Publication Data

US 2018/0366998 A1 Dec. 20, 2018

Related U.S. Application Data

(63) Continuation-in-part of application No. 15/144,116, filed on May 2, 2016, now Pat. No. 10,084,353.

(30) Foreign Application Priority Data

Apr. 30, 2015 (KR) .................. 10-2015-0061433

(51) Int. Cl.
*H02K 1/16* (2006.01)
*H02K 1/24* (2006.01)
(Continued)

(52) U.S. Cl.
CPC .............. *H02K 1/165* (2013.01); *H02K 1/24* (2013.01); *H02K 7/1004* (2013.01);
(Continued)

(58) Field of Classification Search
CPC .............. H02K 21/24; H02K 21/2713; H02K 21/2793; H02K 21/026; H02K 37/08;
(Continued)

(56) References Cited

U.S. PATENT DOCUMENTS 6,787,966 B2 9/2004 Haga
6,933,645 B1* 8/2005 Watson ................ H02K 1/2773
310/156.08
(Continued)

FOREIGN PATENT DOCUMENTS

WO WO-02/058210 A1 7/2002

OTHER PUBLICATIONS

Extended European Search Report dated Sep. 2, 2016 in European Application No. 16165200.3.
(Continued)

*Primary Examiner* — Maged M Almawri
(74) *Attorney, Agent, or Firm* — Saliwanchik, Lloyd & Eisenschenk (57) ABSTRACT

Provided is a rotor including the first extension includes a first protrusion disposed on the inner circumferential surface of the first extension, the first body includes a first groove formed in the outer circumferential surface of the first body, the second extension includes a second protrusion disposed on the inner circumferential surface of the second extension, the second body includes a second groove formed in the outer circumferential surface of the second body, the first body and the second body are stacked and coupled to each other, the first protrusion is disposed in the second groove, and the second protrusion is disposed in the first groove.

10 Claims, 8 Drawing Sheets

(51) Int. Cl.
*H02K 7/10* (2006.01)
*H02K 7/00* (2006.01)
*H02K 3/52* (2006.01)

(52) U.S. Cl.
CPC ........ *B60L 2240/423* (2013.01); *H02K 3/522* (2013.01); *H02K 7/006* (2013.01); *H02K 2203/09* (2013.01)

(58) Field of Classification Search
CPC ........ H02K 49/108; H02K 1/27; H02K 1/182; H02K 1/28; H02K 1/278; H02K 1/30; H02K 1/165; H02K 1/24; H02K 1/246; H02K 1/243; H02K 1/26; H02K 1/265; H02K 7/1004; H02K 7/006; H02K 7/1008; H02K 3/522; H02K 2203/09; H02K 2201/06; H02K 16/00; H02K 16/02; Y02E 10/725; B60L 2240/423
USPC .......... 310/263, 216.009, 216.029, 216.035, 310/216.044, 216.051, 216.052, 216.056, 310/216.121, 216.123, 216.088, 310/156.12–156.15, 156.08, 156.28, 310/156.29, 156.13, 14, 261.1, 310/216.074–216.086, 262–271

See application file for complete search history.

(56) References Cited

U.S. PATENT DOCUMENTS

| | | | | |
|---|---|---|---|---|
| 8,004,140 B2* | 8/2011 | Alexander | ........... | H02K 1/2773 310/156.48 |
| 8,018,110 B2* | 9/2011 | Alexander | ........... | H02K 1/2773 310/156.56 |
| 8,035,273 B2* | 10/2011 | Ionel | ........ | H02K 1/22 310/156.08 |
| 8,525,380 B2* | 9/2013 | Chang | ................. | H02K 49/106 310/156.08 |
| 8,890,386 B2* | 11/2014 | Morita | ................... | H02K 1/27 310/156.66 |
| 2002/0121831 A1 | 9/2002 | Egawa et al. | | |
| 2004/0113511 A1* | 6/2004 | Schmidt | ................ | H02K 1/148 310/216.061 |
| 2004/0124737 A1 | 7/2004 | Yamamoto et al. | | |
| 2004/0155550 A1* | 8/2004 | Yamamoto | ............... | H02K 1/24 310/194 |
| 2004/0164639 A1* | 8/2004 | Yamamoto | ............ | H02K 1/148 310/216.012 |
| 2005/0206264 A1* | 9/2005 | Yamamoto | ............ | H01R 39/32 310/216.001 |
| 2007/0103023 A1* | 5/2007 | Tapper | ................ | H02K 1/2773 310/156.19 |
| 2014/0102674 A1* | 4/2014 | Manz | ................... | H02K 1/2773 165/121 |
| 2014/0103769 A1* | 4/2014 | Kingrey | ................ | H02K 21/16 310/156.12 |
| 2014/0139065 A1* | 5/2014 | Yamada | ................ | H02K 21/16 310/156.66 |
| 2014/0339952 A1* | 11/2014 | Jung | ....................... | H02K 1/28 310/216.123 |
| 2015/0035402 A1* | 2/2015 | Reddy | ................... | H02K 1/272 310/156.01 |

OTHER PUBLICATIONS

Office Action dated Mar. 28, 2019 in Chinese Application No. 201610286002.0.

Office Action dated Dec. 3, 2019 in Chinese Application No. 201610286002.0.

Liang Bingwen, "Machining Technology and Tips", ISBN:7-111-05438-5, Sep. 1997.

* cited by examiner

ROTOR HAVING A FIRST CORE AND A SECOND CORE WITH PROTRUSIONS AND GROOVES COUPLING THE CORES TO EACH OTHER

CROSS-REFERENCE TO RELATED APPLICATIONS

This application is a continuation-in-part of U.S. application Ser. No. 15/144,116, filed May 2, 2016, which claims priority under 35 U.S.C. § 119 to Korean Patent Application No. 10-2015-0061433, filed Apr. 30, 2015, which is hereby incorporated by reference in its entirety.

BACKGROUND

Field of the Invention

The present invention relates to a rotor and a motor having the same, and more particularly, to a rotor around which a coil is wound and a motor having the same.

Discussion of Related Art

Generally, a vehicle includes a starter motor which drives an engine and an alternator which generates electricity using a rotational force of the engine. The starter motor has an ignition switch is connected to a power supply of a battery by an operation of a driver when the vehicle is started up, then the power is supplied to the starter motor, the engine is rotated by a driving force generated by the starter motor, and thus the vehicle is started up.

In comparison, the alternator is connected to a driving unit of the engine to rotate the rotor while a magnetic field is formed by a driving force of the engine, then an alternating current (AC) power is generated, and thus the battery is charged using a rectifier or the like.

Since both of the starter motor and the alternator are configured in a stator-rotor structure, the structures of the starter motor and the alternator are very similar to each other, and can be operated as a power generator or a motor depending on whether a force or power is applied.

Recently, a belt driven starter generator (BSG) capable of functioning as a starter motor and an alternator with a single structure is actively being studied.

Meanwhile, a wound rotor synchronous motor is a motor having a protrusion which protrudes from an outer circumferential surface of a rotor core and around which a coil is wound. The wound rotor synchronous motor has not only been mainly used as a generator but also been recently proposed as a form of a traction motor since a development of a rare earth-free motor has been spotlighted.

However, the motor has to increase the number of coils or a current to increase torque. However, in the case of the BSG, there is a problem in that an increase in torque of the motor is limited because there is a limit in increasing the number of winding coils due to spatial constraints and in increasing a current due to a current limit.

SUMMARY OF THE INVENTION

The present invention is directed to a rotor capable of increasing torque by increasing a space factor of a coil and facilitating assembly, and a motor having the same.

An objective of the present invention is not limited to the above-mentioned objective, and other objectives of the present invention will be clearly understood by one skilled in the art from the following description.

According to an aspect of the present invention, there is provided a rotor including a first core including a first body and a plurality of first teeth protruding from an outer circumferential surface of the first body; and a second core including a second body and a plurality of second teeth protruding from an outer circumferential surface of the second body, wherein each of the first teeth includes a first extension protruding more than a lower surface of the first body, each of the second teeth includes a second extension protruding more than an upper surface of the second body, an inner circumferential surface of the first extension is in contact with the outer circumferential surface of the second body, an inner circumferential surface of the second extension is in contact with the outer circumferential surface of the first body, the first extension includes a first protrusion disposed on the inner circumferential surface of the first extension, the first body includes a first groove formed in the outer circumferential surface of the first body, the second extension includes a second protrusion disposed on the inner circumferential surface of the second extension, the second body includes a second groove formed in the outer circumferential surface of the second body, the first body and the second body are stacked and coupled to each other, the first protrusion is disposed in the second groove, and the second protrusion is disposed in the first groove.

Each of the first groove, the second groove, the first protrusion, and the second protrusion is disposed in a height direction.

In a circumferential direction with respect to the rotor, the first protrusion is disposed at a center of the inner circumferential surface of the first extension; and the second groove is formed at a center of the outer circumferential surface of the second body disposed between the second teeth.

In the circumferential direction with respect to the rotor, the second protrusion is disposed at a center of the inner circumferential surface of the second extension; and the first groove is formed at a center of the outer circumferential surface of the first body disposed between the first teeth.

The first protrusion has a width decreasing from an inner side toward an outer side; the second groove has a width increasing from an inner side toward an outer side, the second protrusion has a width decreasing from an inner side toward an outer side, and the first groove has a width increasing from an inner side toward an outer side.

According to another aspect of the present invention, there is provided a motor which includes a stator, a rotor disposed in the stator; and a shaft coupled to the rotor, wherein the rotor includes a first core including a first body and a plurality of first teeth protruding from an outer circumferential surface of the first body; and a second core including a second body and a plurality of second teeth protruding from an outer circumferential surface of the second body, each of the first teeth includes a first extension protruding more than a lower surface of the first body, each of the second teeth includes a second extension protruding more than an upper surface of the second body, an inner circumferential surface of the first extension is in contact with the outer circumferential surface of the second body, an inner circumferential surface of the second extension is in contact with the outer circumferential surface of the first body, the first extension includes a first protrusion disposed on the inner circumferential surface of the first extension, the first body includes a first groove formed in the outer circumferential surface of the first body, the second extension includes a second protrusion disposed on the inner circumferential of the second extension, the second body includes a second groove formed in the outer circumferential surface of the second body, the first body and the second body are stacked and coupled to each other, the first protrusion is disposed in the second groove, and the second protrusion is disposed in the first groove.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Purposes, specific advantages, and novel features of the invention should be made clearer from exemplary embodiments and the following detailed descriptions in connection with the accompanying drawings. Terms and words used in this specification and claims are not to be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. In the description of the present invention, when it is determined that related well-known technologies unnecessarily obscure the gist of the present invention, the detailed descriptions thereof will be omitted.

Although the terms "first," "second," etc. may be used herein to describe various elements, these elements are not to be limited by these terms. These terms are only used to distinguish one element from another. For example, a first element could be termed a second element, and similarly, a second element could be termed a first element, without departing from the scope of the present invention. The term "and/or" includes any and all combinations of one or more of the associated listed items.

Figure 1:
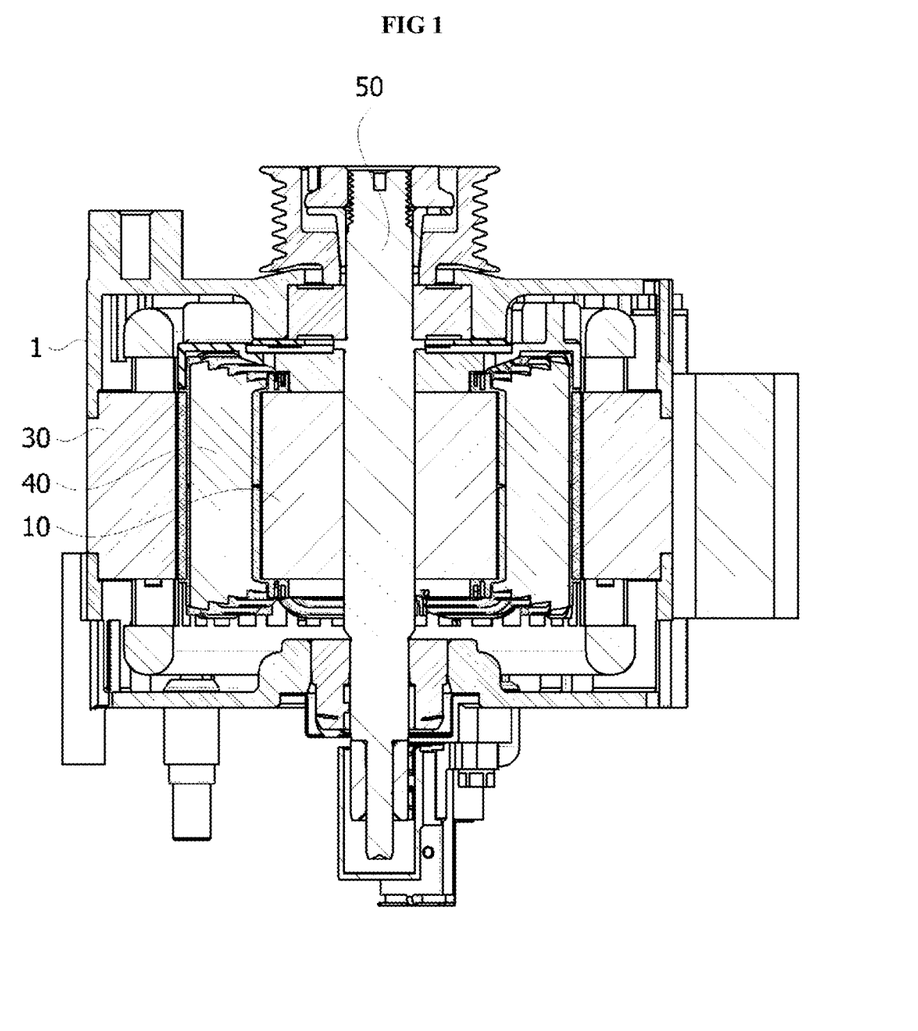
FIG. 1 is a view illustrating a motor according to an exemplarily embodiment of the present invention.

FIG. 1 is a view illustrating a motor according to an exemplary embodiment of the present invention.

Referring to FIG. 1, a motor may include a stator 30 in a housing 1. A rotor 10 is included in the stator 30, and a coil 40 may be wound around the rotor 10. The coil 40 may induce an electrical interaction with the stator 30 to rotate the rotor 10 or induce power by the rotating rotor 10.

Specifically, when the motor operates as a starter motor, the rotor 10 is rotated by an applied driving current to rotate a pulley belt (not shown) connected to a rotating shaft 50 of the rotor 10, and an external component (an engine and the like) may be operated.

Conversely, when the motor operates as an alternator, the pulley belt (not shown) is rotated by an operation of an engine to rotate the rotor 10, and an alternating current (AC) is generated. The generated AC may be supplied to an external component (a battery and the like) by being converted into a direct current (DC).

Figure 2:
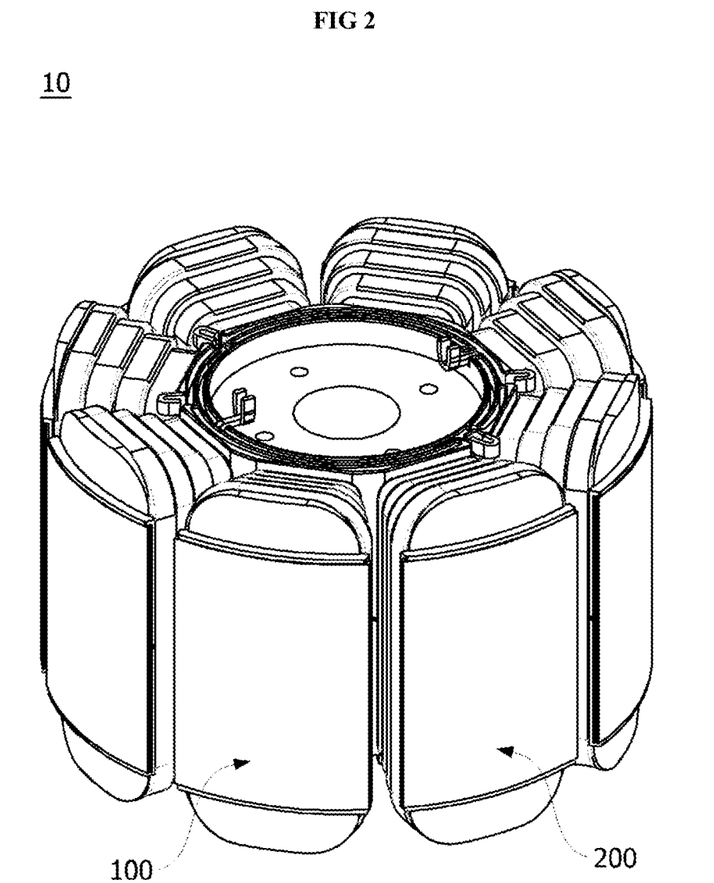
FIG. 2 is a view illustrating a rotor shown in FIG. 1.
Figure 3:
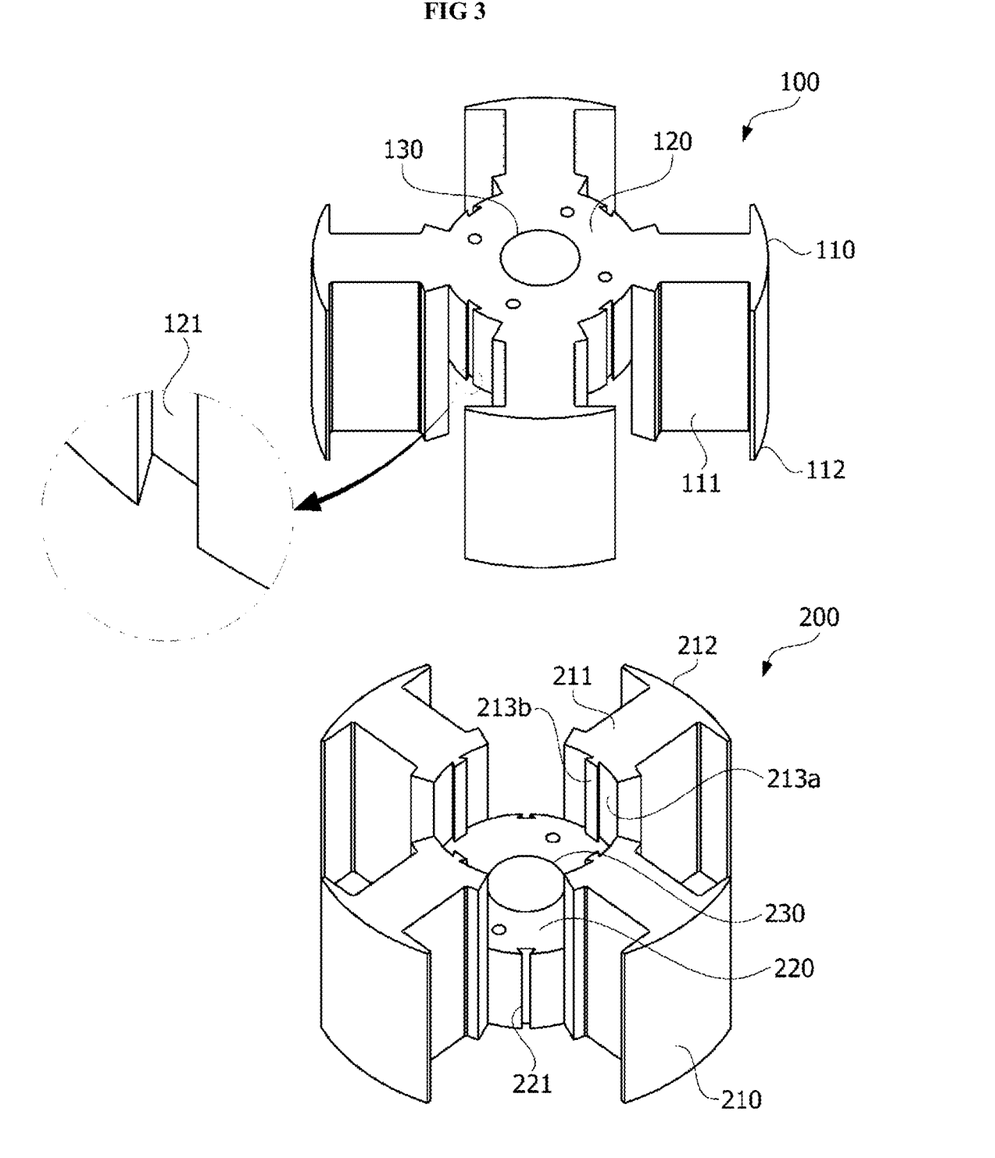
FIG. 3 is a view illustrating a first core and a second core.

FIG. 2 is a view illustrating the rotor shown in FIG. 1, and FIG. 3 is a view illustrating a first core and a second core. FIGS. 2 and 3 clearly illustrate only main characteristic portions for conceptually and clearly understanding the present invention. As a result, various modifications of the illustration are expected, and it is not necessary that the scope of the present invention be limited to specific shapes illustrated in the drawing.

As shown in FIGS. 2 and 3, the rotor 10 according to an exemplary embodiment of the present invention may include a first core 100 and a second core 200. The first core 100 and the second core 200 are elements which form the rotor by being mutually stacked in a height direction. Each of the first core 100 and the second core 200 may be formed by stacking a plurality of plates. In this case, the first core 100 is illustrated as being downwardly coupled to the second core 200.

Referring to FIG. 3, the first core 100 may include first teeth 110. The first teeth 110 protrude from an outer circumferential surface of the first body 110 in a radial direction. Coils are wound around the first teeth 110, and insulators may be installed on the first teeth 110 for insulation. Here, the first teeth 110 may be disposed in a circumferential direction of a first body 120 in a cylindrical shape at regular intervals. A hole 130 into which the rotating shaft 50 is inserted may be formed in the center of the first body 120.

The first teeth 110 may include an arm-type body 111 connected to the first body 120 and a rim-type blocking protrusion 112 formed at a front end of the arm-type body 111. A coil is wound around the arm-type body 111. As shown in FIG. 3, all four of the first teeth 110 may be disposed at regular intervals. The number of the first teeth 110 may vary depending on the number of poles of the motor.

The second core 200 may include second teeth 210. The second teeth 210 protrude from an outer circumferential surface of the second core 200 in a radial direction. Coils are wound around the second teeth 210, and insulators may also be installed on the second teeth 210 for insulation. Further, the second teeth 210 may be disposed in a circumferential direction of a second body 220 in a cylindrical shape at regular intervals. A hole 230 into which the rotating shaft 50 is inserted may be formed in the center of the second body 220.

The second teeth 210 have the same shape as the shape of the first teeth 110. The second protrusion 210 may include an arm-type body 211 connected to the second body 220 and a rim-type blocking protrusion 212 formed at a front end of the arm-type body 211. As shown in FIG. 3, all four of the second teeth 210 may be disposed at regular intervals. The number of the second teeth 210 may vary depending on the number of poles of the motor.

The first core 100 and the second core 200 are disposed so that the first core 100 is disposed at a higher level than the second core 200 and the second core 200 is disposed at a lower level than the first core 100 with respect to an axial center, and thus the first teeth 110 and the second teeth 210 may be stacked and coupled to each other in a complementary state.

Figure 4:
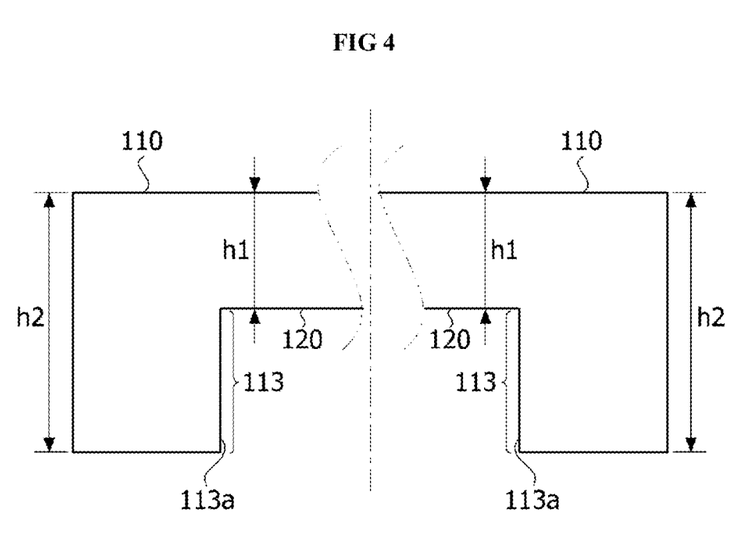
FIG. 4 is a view illustrating a first extension.
Figure 5:
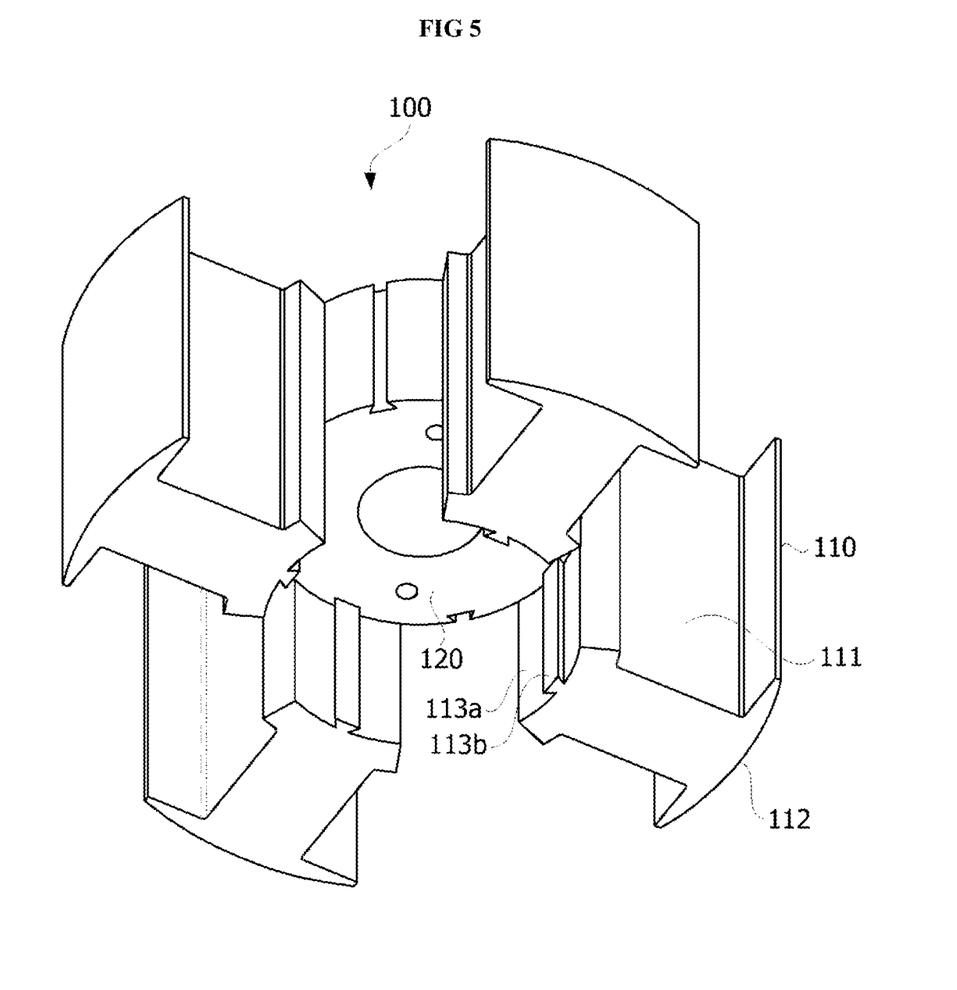
FIG. 5 is a bottom view of the first extension.

FIG. 4 is a view illustrating a first extension, and FIG. 5 is a view illustrating the bottom of the first extension.

Referring to FIGS. 4 and 5, a height h2 of the first teeth 110 is formed to be greater than a height h1 of the cylindrical first body 120, that is, a height of a body of the first core 100. In this case, the height is based on an axial direction of the motor. For example, the first teeth 110 may include a first extension 113 protruding further downward than the first body 120. The first extension 113 is a portion from which the first teeth 110 extends and to which the second body 220 of the second protrusion 210 is coupled.

Referring to FIGS. 3 to 5, the first extension 113 may include a inner circumferential surface 113a aligned with an outer circumferential surface of the cylindrical second body 220 of the second core 200. The inner circumferential surface 113a slidably comes in contact with the outer circumferential surface of the second body 220 of the second teeth 210.

Meanwhile, a first protrusion 113b may be formed from the inner circumferential surface 113a in an axial direction. The first protrusion 113b is inserted into a second groove 221 formed in the cylindrical second body 220 of the second core 200 to allow the first core 100 and the second core 200 to be coupled to each other.

A first groove 121 may be formed in an outer circumferential surface of the first body 120 in the axial direction.

Figure 6:
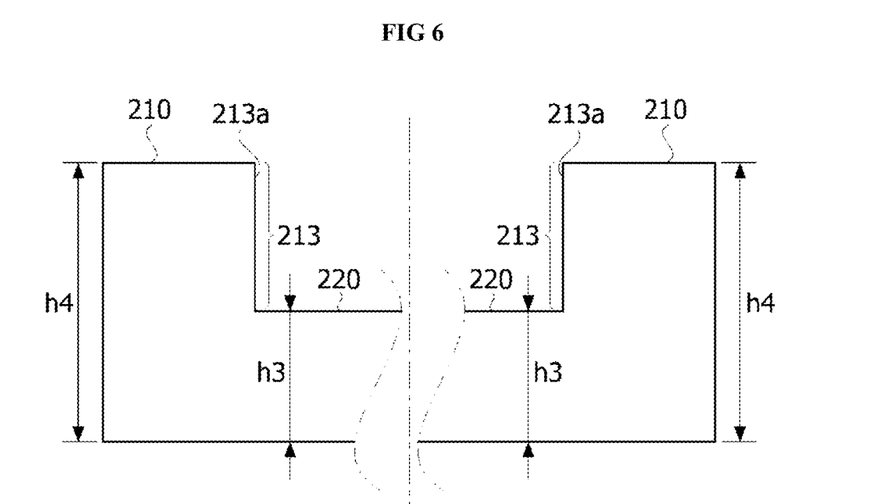
FIG. 6 is a view illustrating a second extension.

FIG. 6 is a view illustrating the second extension.

Referring to FIG. 6, a height h4 of the second teeth 210 is formed to be greater than a height h3 of the cylindrical second body 220, that is, the height of a body of the second core 200. For example, the second teeth 210 may include a second extension 213 protruding further upward than the second body 220. The second extension 213 is a portion from which the second teeth 210 extends and to which the first body 120 of the first teeth 110 is coupled.

Referring to FIGS. 3 and 6, the second extension 213 may include a inner circumferential surface 213a aligned with the outer circumferential surface of the cylindrical first body 120 of the first core 100. The inner circumferential surface 213a slidably comes in contact with the outer circumferential surface of the first body 120

Meanwhile, a second protrusion 213b may be formed from the inner circumferential surface 213a in an axial direction. The second protrusion 213b is inserted into the first groove 121 formed in the cylindrical first body 120 of the first core 100 to allow the first core 100 and the second core 200 to be coupled to each other.

The second groove 221 may be formed in the outer circumferential surface of the second body 220 in the axial direction.

Figure 7:
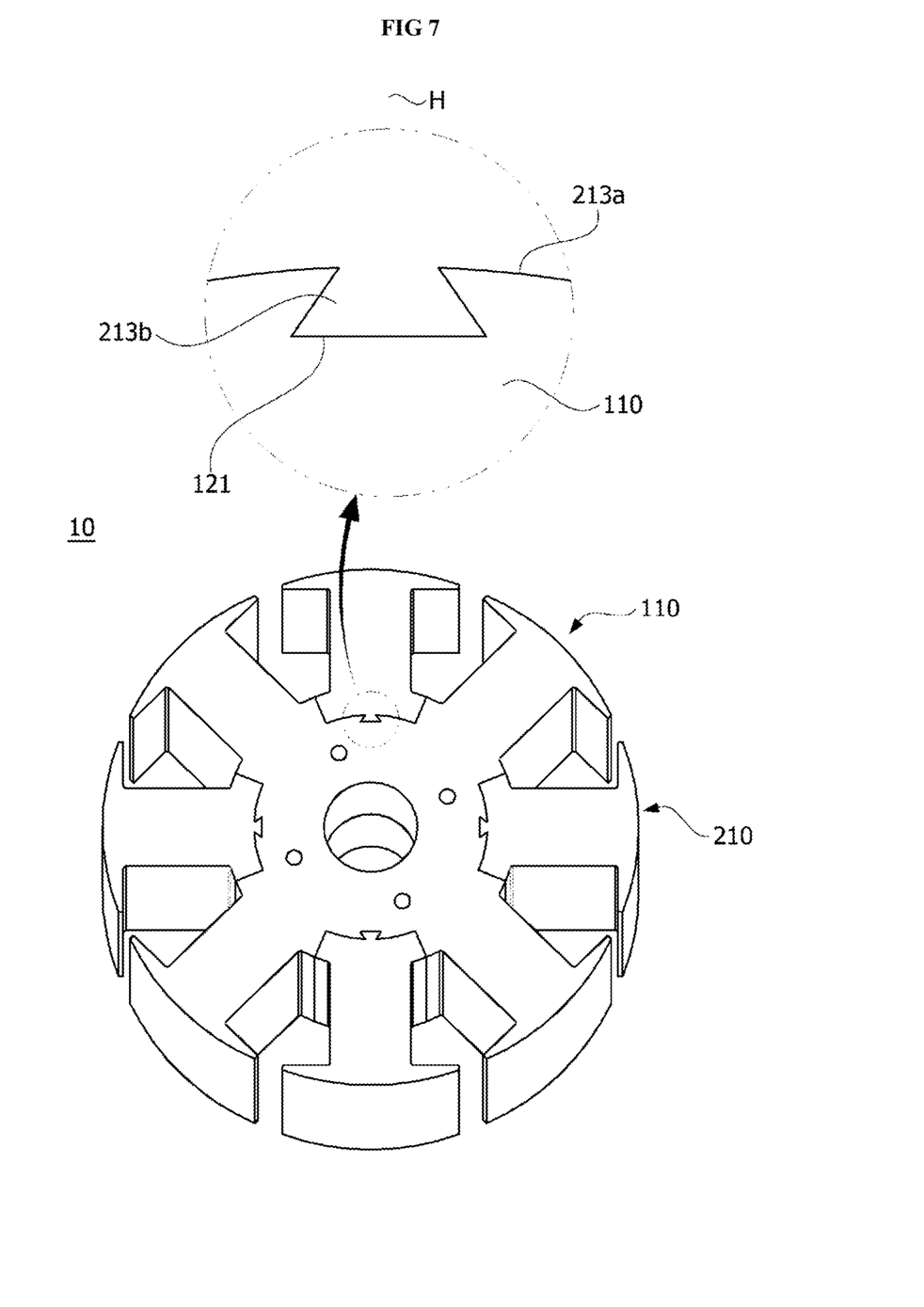
FIG. 7 is a view illustrating a rotor in which the first core and the second core are coupled to each other.

FIG. 7 is a view illustrating the rotor in which the first core and the second core are coupled to each other.

Referring to FIGS. 3 and 7, the first core 100 and the second core 200 are coupled to form the rotor 10 so that the first teeth 110 and the second teeth 210 are alternately disposed with respect to a circumferential direction. To this end, the first teeth 110 and the second teeth 210 may be alternately disposed in the circumferential direction when the first core 100 and the second core 200 are coupled to each other.

As shown in FIG. 7, the second protrusion 213b of the second teeth 210 may be formed to correspond to a reference line H passing through the center of a width direction of the inner circumferential surface 213a in the radial direction. The first protrusion 113b of the first teeth 110 may be also formed to correspond to a reference line passing through the center of a width direction of the inner circumferential surface 113a in the radial direction.

The second protrusion 213b is formed so that a width thereof is reduced from a tip end portion to a root portion, and may be formed so that a mutual binding force is generated between the first core 100 and the second core 200 with respect to the radial direction.

Figure 8:
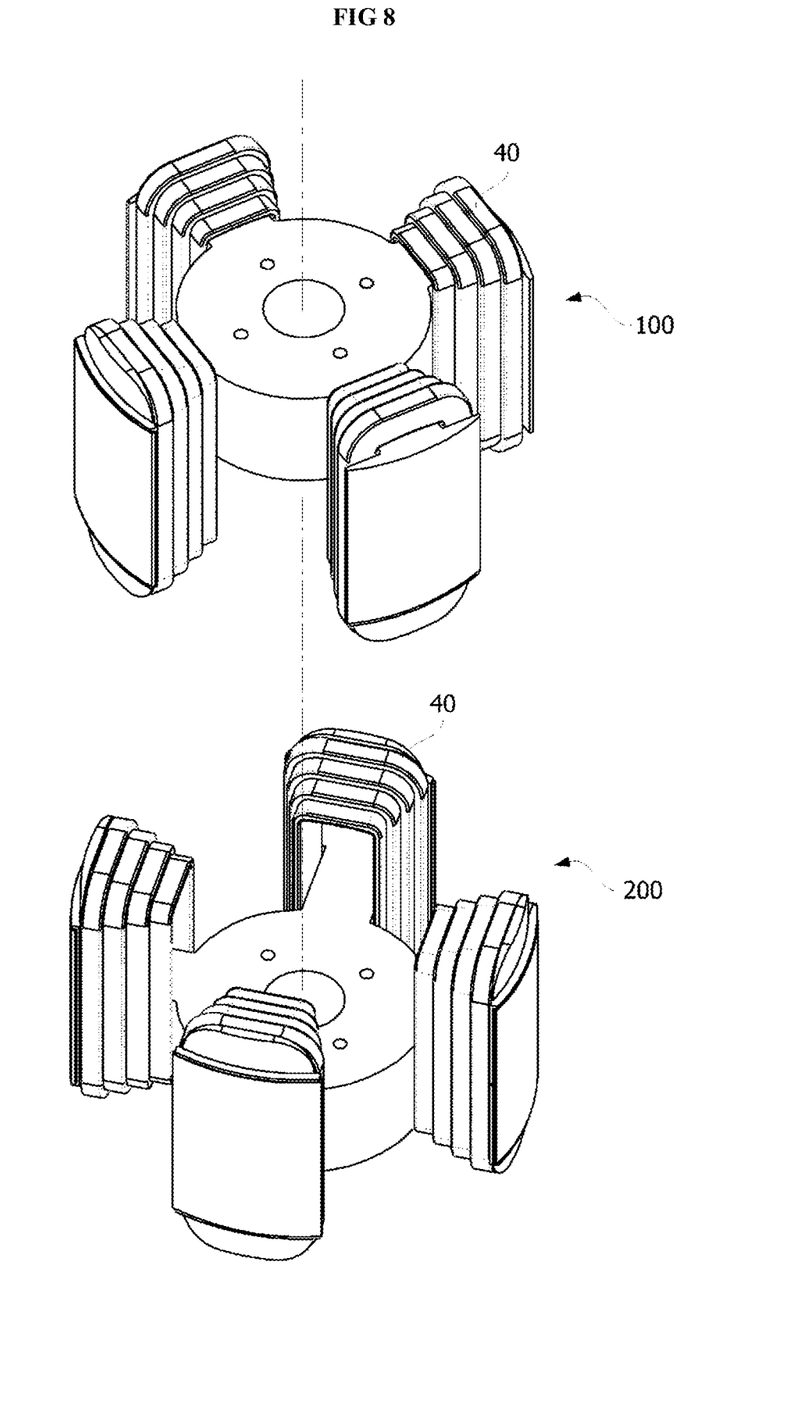
FIG. 8 is a view illustrating a state in which a coil is wound around each of the first core and the second core.

FIG. 8 is a view illustrating a state in which coils are wound around each of the first core and the second core.

As shown in FIG. 8, coils 40 are wound around each of the first core 100 and the second core 200 and then coupled to each other. Because gaps between the protrusions around which the coils are wound are wide in comparison to having a single body, a coil space factor may be remarkably increased. Also, a task of winding the coils may be more easily performed.

According to the embodiment, a plurality of rotor bodies are stacked up to form a rotor, the rotor bodies include protrusions wound which coils are wound, respectively, and the protrusions of the rotor bodies are alternately disposed with respect to a circumferential direction so that the protrusions that are divided constitute the whole protrusion. Therefore, the rotor is formed so that the coils are wound around the respective protrusions that are divided and have relatively wide winding spaces unlike a rotor integrated with protrusions around which coils are wound, thereby increasing a coil space factor and providing an effect of facilitating a winding task.

The rotor according to a single exemplary embodiment of the present invention and the motor having the same have been described above in detail with reference to the accompanying drawings.

The above description is only an example describing the technological scope of the present invention. Various changes, modifications, and replacements may be made by those skilled in the field of the present technology without departing from the spirit and scope of the present invention. Therefore, the embodiments and the accompanying drawings disclosed above should be considered in a descriptive sense only and not for limiting the technological scope. The technological scope of the present invention is not limited by these embodiments and the accompanying drawings. The spirit and scope of the present invention should be interpreted by the appended claims and encompass all equivalents falling within the scope of the appended claims.

DESCRIPTION OF SYMBOL

10: ROTOR
50: ROTATING SHAFT
100: FIRST CORE
110: FIRST PROTRUSION
111, 211: ARM-TYPE BODY
112, 212: BLOCKING PROTRUSION
113: FIRST EXTENSION
113a, 213a: INNER CIRCUMFERENTIAL SURFACE
113b: FIRST PROTRUSION
120: FIRST BODY
121: FIRST GROOVE
200: SECOND CORE
210: SECOND PROTRUSION
213: SECOND EXTENSION
220: SECOND BODY
221: SECOND GROOVE

What is claimed is:

1. A rotor comprising:
a first core including a first body and a plurality of first teeth protruding from an outer circumferential surface of the first core; and a second core including a second body and a plurality of second teeth protruding from an outer circumferential surface of the second core,
wherein each of the first teeth includes a first extension protruding from a lower surface of the first core,
wherein each of the second teeth includes a second extension protruding from an upper surface of the second core,
wherein an inner circumferential surface of the first extension is in contact with the outer circumferential surface of the second core,
wherein an inner circumferential surface of the second extension is in contact with the outer circumferential surface of the first core,
wherein the first extension includes a first protrusion disposed on the inner circumferential surface of the first extension,
wherein the first core includes a first groove formed in the outer circumferential surface of the first core,
wherein the second extension includes a second protrusion disposed on the inner circumferential surface of the second extension, wherein the second core includes a second groove formed in the outer circumferential surface of the second core,
wherein the first core and the second core are stacked and coupled to each other,
wherein the first protrusion is disposed in the second groove,
wherein the second protrusion is disposed in the first groove, and
wherein each of the first teeth has a first height equal to a sum of a second height of the first body and a third height of the first extension, and each of the second teeth has a fourth height equal to the first height and equal to a sum of a fifth height of the second body and a sixth height of the second extension, the inner circumferential surface of the first extension being perpendicular to an outer circumferential surface of the first body and aligned with an outer circumferential surface of the second body, and the inner circumferential surface of the second extension being perpendicular to the outer circumferential surface of the second body and aligned with the outer circumferential surface of the first body, such that the first teeth and the second teeth are stacked and coupled to each other in a complementary manner.

2. The rotor of claim 1, wherein:
the first protrusion has a width decreasing from an inner side toward an outer side;
the second groove has a width increasing from an inner side toward an outer side,
the second protrusion has a width decreasing from an inner side toward an outer side, and
the first groove has a width increasing from an inner side toward an outer side.

3. The rotor of claim 1, wherein each of the first groove, the second groove, the first protrusion, and the second protrusion is disposed in a height direction.

4. The rotor of claim 3, wherein:
in a circumferential direction with respect to the rotor,
the first protrusion is disposed at a center of the inner circumferential surface of the first extension; and
the second groove is formed at a center of the outer circumferential surface of the second core disposed between the second teeth.

5. The rotor of claim 4, wherein:
in the circumferential direction with respect to the rotor, the second protrusion is disposed at a center of the inner circumferential surface of the second extension; and
the first groove is formed at a center of the outer circumferential surface of the first core disposed between the first teeth.

6. A motor comprising:
a stator;
a rotor disposed in the stator; and
a shaft coupled to the rotor,
wherein the rotor includes:
a first core including a first body and a plurality of first teeth protruding from an outer circumferential surface of the first core; and
a second core including a second body and a plurality of second teeth protruding from an outer circumferential surface of the second core,
wherein each of the first teeth includes a first extension protruding from a lower surface of the first core,
wherein each of the second teeth includes a second extension protruding from an upper surface of the second core,
wherein an inner circumferential surface of the first extension is in contact with the outer circumferential surface of the second core,
wherein an inner circumferential surface of the second extension is in contact with the outer circumferential surface of the first core,
wherein the first extension includes a first protrusion disposed on the inner circumferential surface of the first extension,
wherein the first core includes a first groove formed in the outer circumferential surface of the first core,
wherein the second extension includes a second protrusion disposed on the inner circumferential surface of the second extension,
wherein the second core includes a second groove formed in the outer circumferential surface of the second core,
wherein the first core and the second core are stacked and coupled to each other,
wherein the first protrusion is disposed in the second groove,
wherein the second protrusion is disposed in the first groove, and
wherein each of the first teeth has a first height equal to a sum of a second height of the first body and a third height of the first extension, and each of the second teeth has a fourth height equal to the first height and equal to a sum of a fifth height of the second body and a sixth height of the second extension, the inner circumferential surface of the first extension being perpendicular to an outer circumferential surface of the first body and aligned with an outer circumferential surface of the second body, and the inner circumferential surface of the second extension being perpendicular to the outer circumferential surface of the second body and aligned with the outer circumferential surface of the first body, such that the first teeth and the second teeth are stacked and coupled to each other in a complementary manner.

7. A rotor comprising:
a first core including a first body and a plurality of first teeth protruding from an outer circumferential surface of the first core; and
a second core including a second body and a plurality of second teeth protruding from an outer circumferential surface of the second core, wherein each of the first teeth includes a first extension protruding from a lower surface of the first core,
wherein each of the second teeth includes a second extension protruding from an upper surface of the second core,
wherein an inner circumferential surface of the first extension is in contact with the outer circumferential surface of the second core,
wherein an inner circumferential surface of the second extension is in contact with the outer circumferential surface of the first core,
wherein the first extension includes a first protrusion having a height smaller than a height of the first teeth in an axial direction of the rotor and disposed on the inner circumferential surface of the first extension,
wherein the first core includes a first groove formed in the outer circumferential surface of the first core,
wherein the second extension includes a second protrusion having a height smaller than of a height of the second teeth in the axial direction of the rotor and disposed on the inner circumferential surface of the second extension,
wherein the second core includes a second groove formed in the outer circumferential surface of the second core,
wherein the first core and the second core are stacked and coupled to each other,
wherein the first protrusion is disposed in the second groove,
wherein the second protrusion is disposed in the first groove, and
wherein each of the first teeth has a first height equal to a sum of a second height of the first body and a third height of the first extension, and each of the second teeth has a fourth height equal to the first height and equal to a sum of a fifth height of the second body and a sixth height of the second extension, the inner circumferential surface of the first extension being perpendicular to an outer circumferential surface of the first body and aligned with an outer circumferential surface of the second body, and the inner circumferential surface of the second extension being perpendicular to the outer circumferential surface of the second body and aligned with the outer circumferential surface of the first body, such that the first teeth and the second teeth are stacked and coupled to each other in a complementary manner.

8. A motor comprising:
a stator;
a rotor disposed in the stator; and
a shaft coupled to the rotor,
wherein the rotor includes:
a first core including a first body and a plurality of first teeth protruding from an outer circumferential surface of the first core; and
a second core including a second body and a plurality of second teeth protruding from an outer circumferential surface of the second core,
wherein each of the first teeth includes a first extension protruding from a lower surface of the first core,
wherein each of the second teeth includes a second extension protruding from an upper surface of the second core,
wherein an inner circumferential surface of the first extension is in contact with the outer circumferential surface of the second core,
wherein an inner circumferential surface of the second extension is in contact with the outer circumferential surface of the first core,
wherein the first extension includes a first protrusion having a height smaller than a height of the first teeth in an axial direction of the rotor and disposed on the inner circumferential surface of the first extension,
wherein the first core includes a first groove formed in the outer circumferential surface of the first core,
wherein the second extension includes a second protrusion having a height smaller than a height of the second teeth in the axial direction of the rotor and disposed on the inner circumferential surface of the second extension,
wherein the second core includes a second groove formed in the outer circumferential surface of the second core,
wherein the first core and the second core are stacked and coupled to each other,
wherein the first protrusion is disposed in the second groove,
wherein the second protrusion is disposed in the first groove, and
wherein each of the first teeth has a first height equal to a sum of a second height of the first body and a third height of the first extension, and each of the second teeth has a fourth height equal to the first height and equal to a sum of a fifth height of the second body and a sixth height of the second extension, the inner circumferential surface of the first extension being perpendicular to an outer circumferential surface of the first body and aligned with an outer circumferential surface of the second body, and the inner circumferential surface of the second extension being perpendicular to the outer circumferential surface of the second body and aligned with the outer circumferential surface of the first body, such that the first teeth and the second teeth are stacked and coupled to each other in a complementary manner.

9. A rotor comprising:
a first core including a first body and a plurality of first teeth protruding from an outer circumferential surface of the first core; and
a second core including a second body and a plurality of second teeth protruding from an outer circumferential surface of the second core,
wherein each of the first teeth includes a first extension protruding from a lower surface of the first core,
wherein each of the second teeth includes a second extension protruding from an upper surface of the second core,
wherein an inner circumferential surface of the first extension is in contact with an outer circumferential surface of the second body,
wherein an inner circumferential surface of the second extension is in contact with the outer circumferential surface of the first body,
wherein the first extension includes a first protrusion disposed on the inner circumferential surface of the first extension,
wherein the first core includes a first groove formed in an outer circumferential surface of the first body,
wherein the second extension includes a second protrusion disposed on the inner circumferential surface of the second extension,
wherein the second core includes a second groove formed in the outer circumferential surface of the second body, wherein when the first protrusion is disposed in the second groove and the second protrusion is disposed in the first groove in an axial direction, the first core and the second core are coupled to each other, wherein the first protrusion and the second protrusion are alternately disposed in the circumferential direction, when the first core and the second core are coupled to each other, and wherein each of the first teeth has a first height equal to a sum of a second height of the first body and a third height of the first extension, and each of the second teeth has a fourth height equal to the first height and equal to a sum of a fifth height of the second body and a sixth height of the second extension, the inner circumferential surface of the first extension being perpendicular to the outer circumferential surface of the first body and aligned with the outer circumferential surface of the second body, and the inner circumferential surface of the second extension being perpendicular to the outer circumferential surface of the second body and aligned with the outer circumferential surface of the first body, such that the first teeth and the second teeth are stacked and coupled to each other in a complementary manner.

10. A motor comprising:

a stator;

a rotor disposed in the stator; and a shaft coupled to the rotor, wherein the rotor includes:

a first core including a first body and a plurality of first teeth protruding from an outer circumferential surface of the first core; and a second core including a second body and a plurality of second teeth protruding from an outer circumferential surface of the second core, wherein each of the first teeth includes a first extension protruding from a lower surface of the first core, wherein each of the second teeth includes a second extension protruding from an upper surface of the second core, wherein an inner circumferential surface of the first extension is in contact with an outer circumferential surface of the second body, wherein an inner circumferential surface of the second extension is in contact with the outer circumferential surface of the first body, wherein the first extension includes a first protrusion disposed on the inner circumferential surface of the first extension, wherein the first core includes a first groove formed in an outer circumferential surface of the first body, wherein the second extension includes a second protrusion disposed on the inner circumferential surface of the second extension, wherein the second core includes a second groove formed in the outer circumferential surface of the second body, wherein when the first protrusion is disposed in the second groove and the second protrusion is disposed in the first groove in an axial direction, the first core and the second core are coupled to each other, wherein the first protrusion and the second protrusion are alternately disposed in the circumferential direction, when the first core and the second core are coupled to each other, and wherein each of the first teeth has a first height equal to a sum of a second height of the first body and a third height of the first extension, and each of the second teeth has a fourth height equal to the first height and equal to a sum of a fifth height of the second body and a sixth height of the second extension, the inner circumferential surface of the first extension being perpendicular to the outer circumferential surface of the first body and aligned with the outer circumferential surface of the second body, and the inner circumferential surface of the second extension being perpendicular to the outer circumferential surface of the second body and aligned with the outer circumferential surface of the first body, such that the first teeth and the second teeth are stacked and coupled to each other in a complementary manner.

* * * * *